May 30, 1939. W. H. HAYNES 2,160,732
GROOVING AND SURFACING MACHINE
Filed Dec. 3, 1937 3 Sheets-Sheet 1
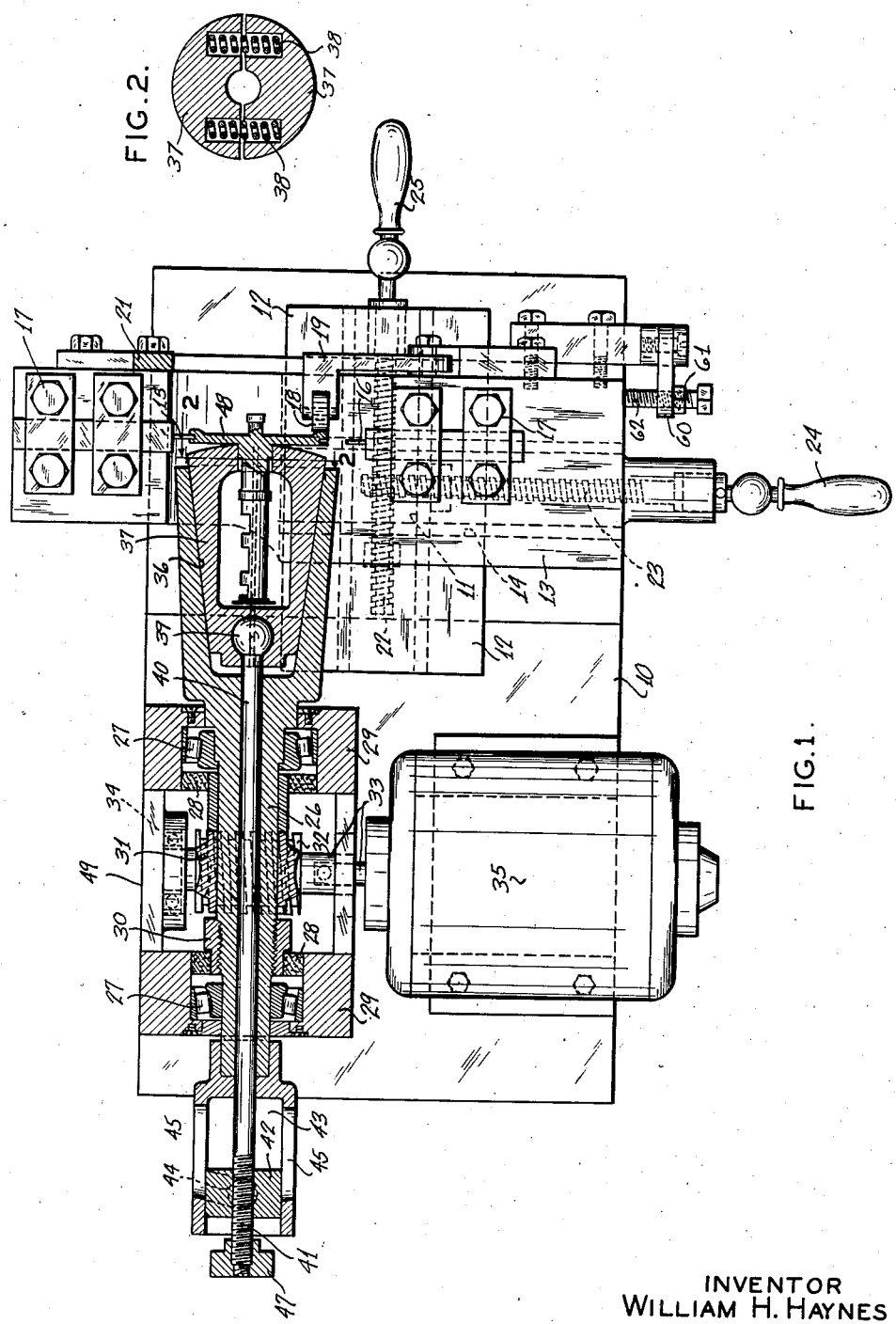
INVENTOR
WILLIAM H. HAYNES
BY Roy M. Eilers
ATTORNEY May 30, 1939.   W. H. HAYNES   2,160,732
GROOVING AND SURFACING MACHINE
Filed Dec. 3, 1937   3 Sheets-Sheet 2.
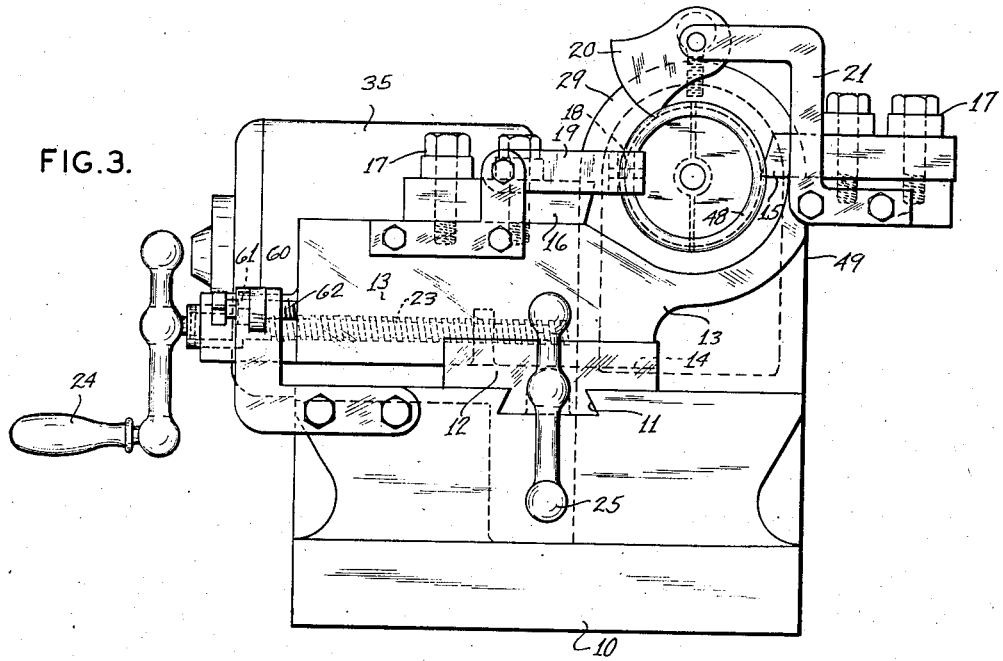
INVENTOR
WILLIAM H. HAYNES
BY Roy M. Eilers
ATTORNEY May 30, 1939.  W. H. HAYNES  2,160,732
GROOVING AND SURFACING MACHINE
Filed Dec. 3, 1937  3 Sheets-Sheet 3

INVENTOR
WILLIAM H. HAYNES
BY Roy M. Eilers
ATTORNEY

Patented May 30, 1939

2,160,732

UNITED STATES PATENT OFFICE 2,160,732

GROOVING AND SURFACING MACHINE

William H. Haynes, Little Rock, Ark.

Application December 3, 1937, Serial No. 177,868

7 Claims. (Cl. 82—2)

This invention relates to a device which may be used for grooving, re-grooving, or surfacing pistons, valves, and similar parts.

One use of my invention is for the re-grooving of pistons. After the ring groove on pistons becomes worn, the rings do not fit tight enough to prevent leakage around the groove. It has been found, however, that pistons may be restored to proper operating condition by re-cutting the groove to exact fit with new piston rings. A considerable saving over the replacement price of the pistons is thus effected.

A machine which is to be used to re-groove pistons must be extremely accurate to insure a perfect ring fit. It must also be free from lateral motion of the spindle or tools and from vibration at the point where the groove is being cut.

This invention provides a device which fulfills these requirements, and in addition, is provided with a new quick-acting type chuck or collet which facilitates the insertion and removal of pistons even though they have irregular shaped shanks or stems. The machine shown and described is also provided with a quick-locking device for the collet or chuck.

This invention also provides means to align a piston in the device as well as means to align the cutting tools of the device with the old piston groove.

The spindle and bearings of the device are arranged so they will have no lateral movement and will thus cut an accurate groove. The chuck or collet is designed so that the tightening of the collet on a piston or valve shank will not place any strain on the bearings or other moving parts of the device.

These and other objects and advantages will become apparent from the following description and accompanying drawings.

In all the drawings the same reference numerals are used to denote the same or similar parts.

For the sake of illustration and description I show and describe one particular form of my invention as used on the pistons of the triple valves of railroad air brakes. It is to be understood, however, that this particular form and use of my invention is used for illustration only and is not to limit my invention.

Fig. 1 is a plan view of my re-grooving machine with a portion thereof shown in cross section.

Fig. 2 is a section through the collet or chuck taken along line 2—2 of Fig. 1.

Fig. 3 is an end view of my re-grooving machine.

Fig. 5 is a longitudinal section through a press showing a piston in position for compressing the old ring groove.

Fig. 6 is a plan view of the device used for gauging the amount which the old ring groove is compressed.

Figure 4:
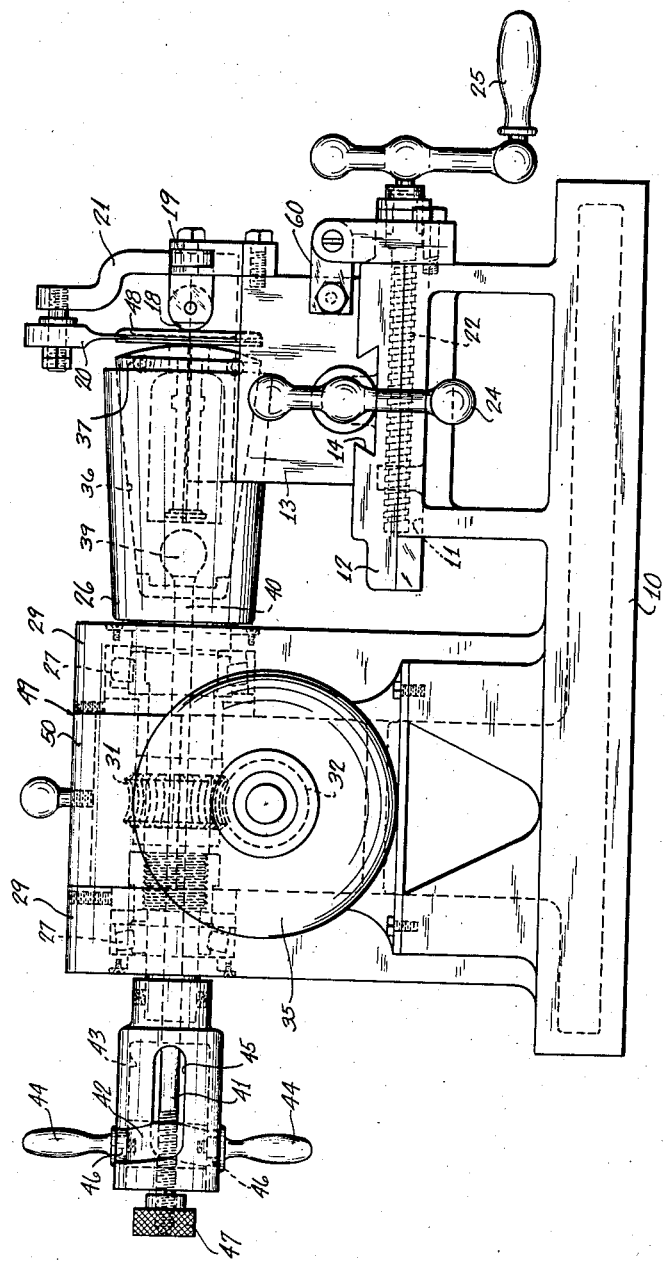
Fig. 4 is a side view of my re-grooving machine.

Referring now to the drawings: 10 is the base of the machine and is provided with a longitudinal slide 11 in which a longitudinal sliding member 12 operates. 13 is a cross sliding member which operates in a cross slide 14 formed in the member 12. 13 is the member used to support the various operating tools such as carbide cutting tools 15 and 16 which are held in place by tool clamps and bolts 17. 18 is a roller mounted on a folding arm 19 also secured to the member 13. 20 is an aligning finger which is pivoted to the arm 21. 22 is a worm for driving the longitudinal sliding member 12 and 23 the worm for driving the cross sliding member 13. The worm 22 is provided with the handle 25 and the worm 23 provided with the handle 24.

26 is a spindle supported in tapered roller bearings 27. 28 are grease retainers which may be used in the bearing supports 29. 30 is a lock nut for adjusting the position of the spindle. 31 is a worm gear secured to the spindle and driven by the worm 32. 33 is the worm drive shaft supported in a bearing 34 and driven by a motor 35. 36 is a tapered opening in one end of the spindle. 37 is a collet or chuck of the two-piece type opened and held apart by springs 38. The chuck or collet is closed by being drawn into the tapered opening 36 by means of the ball 39 on the end of the rod 40. One end 41 of this rod is threaded and a nut 42 positioned on these threads. This nut slides in a hollow member 43.

Two handles 44 actuate the nut 42 and operate in grooves 45. One part of each groove extends longitudinally of the hollow member 43 and the other part extends at an angle to the longitudinal portion as shown. Rollers 46 enable the handle to operate easily in the grooves. 47 is a nut used to turn the rod 40 and adjust the position of the rod in the nut 42 to adapt the collet for use with different size piston stems or shanks. Thus to draw the collet or chuck into the tapered portion of the spindle for tightening the chuck around a piston 48, the handles are pulled back through the longitudinal part of the grooves 45 and then given a twist into the angular part of the grooves to lock the chuck in the closed position. This is an especially quick acting type of locking device and greatly facilitates the insertion and removal of pistons in the chuck. Pistons and valves often have a shank or stem of irregular shape and often have portions of the shank larger than the part held or gripped by the chuck. This chuck will easily accommodate such pistons and valves for ample space is provided behind the jaws of the chuck for such irregular portions.

The worm gears may be enclosed by a gear box 49 and cover 50.

With the particular type of piston shown, which is a type used in the triple valves of railroad air brake systems, the following procedure may be followed for re-grooving.

The piston 48 may be placed, as shown in Fig. 5, in a die 51. A thickness gauge 52 is then inserted in the old piston ring groove by means of a gauge handler 54 to which the gauge 52 is secured. The gauge handler is hinged as at 56. After the thickness gauge is inserted in the piston ring groove, the upper portion 58 of a die press is forced down onto the piston and the piston ring groove pressed together.

The piston is then removed from the press and placed in the collet 37 where its edges are trued up in the collet by the roller 18 which is drawn into the clear when not in use. The collet is then locked closed by the handles 44 after which the aligning finger 20 is dropped onto the edge of the piston and the longitudinal sliding member 12 moved back and forth by the handle 25 until the aligning finger 20 drops into the piston groove. The cutting tools 15 and 16 are in alignment with the finger 20 so that when it drops into the old groove, the cutting tools are also aligned with the old groove. The thickness of this finger 20 may be the same as that of the gauge 52 in order that the old groove may be perfectly lined up with the cutting tools. After the cutting tools are properly aligned, the finger 20 may be removed from the groove.

The cross member is first moved in position so that one of the tools, say 15, which may be a roughing tool, is brought into operation while the spindle is rotated and then this tool is backed away and the tool 16, a finishing tool, brought into operation. A new and accurate groove is thus cut.

The piston is often enlarged when in the die press and may be cut back to size by backing the tool 15 out of the groove and using it across the outside of the piston. For this purpose, a stop 60 acting against a nut 61 positioned on a bolt 62 may be tripped into position to hold the cross member in exact position for turning the piston to standard size.

While I have described the operation of the device as it would be used on a piston, it is obvious that the device can be used to advantage in performing grooving, surfacing, or other operations on not only pistons but valves and other objects to which the machine is readily adaptable. The type of collet used makes the device especially adaptable for use on any part with a plain or irregular shank.

The machine thus provided has a quick operating chuck or collet and a tightening device which does not put any pressure or strain on the bearings. In addition, the quick acting lock mechanism may be adjusted to accommodate the collet to various sized piston shanks. The quick method of alignment materially reduces the time required by previous methods of re-grooving pistons. The machine is especially light and compact and is thus easily handled.

While for the purpose of description I have illustrated and described but one form of my invention, it will become apparent to those skilled in the art that various additions, substitutions, omissions, and modifications may be made therein without departing from the spirit and scope of the invention as defined by the appended claims.

I claim:

1. In a re-grooving machine, a base, a spindle rotatably supported on said base, a chuck carried by said spindle, a tool carrying member provided with means to move it both laterally and longitudinally of said base, tools carried by said tool carrying member and disposed on opposite sides of the axis of the spindle, a finger secured to the tool carrying member in alignment with said tools and adapted to align the tools with a groove of the work carried in the chuck.

2. In a re-grooving machine, a base, a spindle rotatably supported on said base, a chuck carried by said spindle, a tool carrying member which may be moved both laterally and longitudinally of said base, tools carried by said tool carrying member and disposed on opposite sides of the axis of the spindle, a finger in alignment with said tools adapted to align the old groove of work carried in the chuck with said tools, and means adapted to engage a face of the work perpendicular to the axis of the spindle and properly align the work in the re-grooving machine.

3. In apparatus of the type described, a base, a member movable longitudinally of said base, a member movable laterally of said base and carried by the longitudinally movable member, a spindle rotatably supported on said base and carrying a chuck at one end thereof, cutting tools carried by the laterally movable member and disposed on opposite sides of the axis of the spindle, one of said tools being adapted to engage a piece of work carried in the chuck when the laterally movable member is moved in one direction and the other of said tools being adapted to engage the work when the laterally movable member is moved in the opposite direction.

4. In a device of the character described, a base, a spindle rotatably supported on said base, a chuck carried by said spindle, a tool carrying member movable both laterally and longitudinally of the base, oppositely disposed cutting tools carried by said tool carrying member, lateral movement of the tool carrying member in one direction being adapted to bring one of said tools into engagement with work carried in the chuck and lateral movement of the carrying member in the opposite direction being adapted to disengage the first tool and bring the other tool into engagement with the work.

5. In a piston re-grooving machine, a base, a spindle rotatably supported on said base and provided with a tapered opening at one end thereof, a chuck seated in said opening and provided with jaws at one end thereof and a cavity behind said jaws, a rod extending through the spindle and secured at one end thereof to the chuck, a hollow member positioned at the other end of the spindle and provided with a slot having one part extending longitudinally of the hollow member and another part angularly to the longitudinal portion, a member within the hollow member secured to the other end of the rod and provided with a projection to cooperate with said slot, a tool carrying member with tools oppositely disposed thereon, and means on the tool carrying member to align the tools with an old groove in a piston carried by the chuck.

6. In a piston re-grooving machine, a base, a spindle rotatably supported on said base and provided with a tapered opening at one end thereof, a chuck seated in said opening and provided with jaws at one end thereof and a cavity behind said jaws, a socket in the other end of said chuck, a rod extending through the spindle and provided with a ball at one end thereof adapted to engage said socket, a hollow member positioned at the other end of the spindle and provided with a slot having one part extending longitudinally of the hollow member and another part angularly to the longitudinal part, a member within the hollow member secured to the other end of the rod and provided with a projection to cooperate with said slot, a tool carrying member with tools oppositely disposed thereon, means on the tool carrying member to align the tools with an old groove in a piston carried by the chuck, and other means to properly align the piston in the chuck.

7. In a piston re-grooving machine, a base, a spindle rotatably supported on said base and provided with a tapered opening at one end thereof, a chuck seated in said opening and provided with jaws at one end thereof and a cavity behind said jaws, a socket in the other end of said chuck, a rod extending through the spindle and provided with a ball at one end thereof adapted to engage said socket, a hollow member positioned at the other end of the spindle and provided with a slot having one part extending longitudinally of the hollow member and another part angularly to the longitudinal part, a member within the hollow member secured to the other end of the rod and provided with a projection to cooperate with said slot, a tool carrying member with tools oppositely disposed thereon, and means on the tool carrying member to align the tools with an old groove in a piston carried by the chuck.

WILLIAM H. HAYNES.